United States Patent
Shukla et al.

(10) Patent No.: US 9,019,973 B1
(45) Date of Patent: Apr. 28, 2015

(54) STATIC MAC ADDRESS PROPAGATION IN MULTIPOINT NETWORK SERVICES

(71) Applicant: Juniper Networks, Inc., Sunnyvale, CA (US)

(72) Inventors: Pankaj Shukla, San Jose, CA (US); Wen Lin, Andover, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 217 days.

(21) Appl. No.: 13/631,521

(22) Filed: Sep. 28, 2012

(51) Int. Cl.
*H04L 12/28* (2006.01)
*H04L 12/751* (2013.01)
*H04L 12/721* (2013.01)

(52) U.S. Cl.
CPC .............. *H04L 45/02* (2013.01); *H04L 45/66* (2013.01)

(58) Field of Classification Search
USPC ......... 370/254, 312, 389–392, 395.1–395.33, 370/401, 395.3–395.31, 395.5, 400, 410
See application file for complete search history.

(56) References Cited

U.S. PATENT DOCUMENTS

| | | | |
|---|---|---|---|
| 7,020,150 B2 | 3/2006 | Ho et al. | |
| 7,644,317 B1 | 1/2010 | Sajassi et al. | |
| 7,697,534 B1* | 4/2010 | Narayanan et al. | 370/392 |
| 7,769,873 B1* | 8/2010 | Mackie | 709/229 |
| 7,986,695 B1* | 7/2011 | Kodeboyina et al. | 370/392 |
| 8,125,926 B1* | 2/2012 | Kompella | 370/254 |
| 8,170,033 B1* | 5/2012 | Kothari et al. | 370/395.53 |
| 2002/0016926 A1* | 2/2002 | Nguyen et al. | 713/201 |
| 2002/0196761 A1* | 12/2002 | Kaneko | 370/338 |
| 2004/0266420 A1* | 12/2004 | Malinen et al. | 455/421 |
| 2007/0047557 A1* | 3/2007 | Martini et al. | 370/395.53 |
| 2007/0086455 A1 | 4/2007 | Allan et al. | |
| 2007/0183419 A1* | 8/2007 | Kompella | 370/389 |
| 2007/0268915 A1* | 11/2007 | Zelig et al. | 370/401 |
| 2008/0112323 A1 | 5/2008 | Agmon et al. | |
| 2008/0205404 A1* | 8/2008 | Wen et al. | 370/392 |

(Continued)

FOREIGN PATENT DOCUMENTS

| | | |
|---|---|---|
| EP | 1956766 A1 | 8/2008 |
| EP | 2254276 A1 | 11/2010 |
| WO | WO 2011140921 A1 * | 11/2011 |

OTHER PUBLICATIONS

Scudder, J. et al., Capabilities Advertisement with BGP-4, Feb. 2009, Networking Working Group, Request for Comments 5492, pp. 3-4.*

(Continued)

*Primary Examiner* — Edan Orgad
*Assistant Examiner* — Steven Willmore
(74) *Attorney, Agent, or Firm* — Shumaker & Sieffert, P.A.

(57) ABSTRACT

A first network device receives a control message at an interface from a second network device, wherein the first network device and the second network device use a multipoint service that provides layer two (L2) connectivity between L2 networks. The control message specifies one or more L2 addresses of customer network devices that are provided connectivity to an autonomous system by the second network device, wherein the control message identifies the L2 addresses as static L2 addresses that are to be persistently maintained at the first network device as reachable by the interface. In response to receiving the control message and by the first network device, the first network device stores the L2 addresses as persistently maintained static L2 addresses being reachable by the interface at which the control message was received.

27 Claims, 7 Drawing Sheets

(56) References Cited

U.S. PATENT DOCUMENTS

| | | |
|---|---|---|
| 2008/0225695 A1 | 9/2008 | Balus et al. |
| 2009/0161669 A1* | 6/2009 | Bragg et al. ............... 370/389 |
| 2010/0085982 A1* | 4/2010 | Martinotti et al. ........... 370/420 |
| 2010/0128728 A1 | 5/2010 | Sun et al. |
| 2010/0177674 A1* | 7/2010 | Aggarwal .................... 370/312 |
| 2010/0302973 A1* | 12/2010 | Lange et al. ................ 370/254 |
| 2011/0032945 A1* | 2/2011 | Mullooly et al. ............ 370/401 |
| 2011/0142053 A1* | 6/2011 | Van Der Merwe et al. ............... 370/395.1 |
| 2011/0222413 A1* | 9/2011 | Shukla et al. ............. 370/241.1 |
| 2011/0271009 A1* | 11/2011 | Doshi et al. .................. 709/242 |
| 2011/0286466 A1* | 11/2011 | Ge et al. ..................... 370/401 |
| 2014/0056125 A1* | 2/2014 | Guellal et al. ............... 370/225 |

OTHER PUBLICATIONS

Kompella et al., "Virtual Private LAN Service (VPLS) Using BGP for Auto-Discovery and Signaling," RFC 4761, Jan. 2007, 29 pp.

Lasserre et al., "Virtual Private LAN Service (VPLS) Using Label Distribution Protocol (LDP) Signaling," RFC 4762, Jan. 2007, 32 pp.

Sangli et al., "BGP Extended Communities Attribute," RFC 4360, Feb. 2006, 12 pp.

Marques et al., "Constrained Route Distribution for Border Gateway Protocol/MultiProtocol Label Switching (BGP/MPLS) Internet Protocol (IP) Virtual Private Networks (VPNs)," RFC 4864, Nov. 2006, 13 pp.

Kompella et al., "Multi-Homing in BGP-based Virtual Private LAN Service," RFC 4761 updates, Nov. 3, 2008, 27 pp.

Scudder et al., "Capabilities Advertisement with BGP-4," RFC 5492, Feb. 2009, 7 pp.

IEEE P802.1ah-2008, "Standard for Local and Metropolitan Area Networks—Virtual Bridged Local Area Networks—Amendment 6: Provider Backbone Bridges," Draft Amendment to IEEE Std 802.1Q-REV, Mar. 26, 2008, 116 pp.

Sajassi et al., "Customer MAC Address Flushing Mechanisms for Provider Backbone Bridging over VPLS," Internet Working Group Internet Draft, draft-sajassi-l2vpn-pbb-vpls-cmac-flush-00.txt, Jul. 2008, 14 pp.

Kothari et al., "VPLS Flush in BGP-based Virtual Private LAN Service," Network Working Group Internet Draft, draft-kothari-l2vpn-vpls-flush-00.txt, Oct. 27, 2008, 15 pp.

\* cited by examiner

STATIC MAC ADDRESS PROPAGATION IN MULTIPOINT NETWORK SERVICES

TECHNICAL FIELD

The disclosure relates to computer networks and, more particularly, to multipoint computer networks.

BACKGROUND

Networks that primarily use data link layer devices for providing multi-point connectivity are often referred to as layer two (L2) networks. A data link layer device is a device that operates within the second layer of the Open Systems Interconnection (OSI) reference model, i.e., the data link layer. One example of a common L2 networks is an Ethernet network in which end point devices (e.g., servers, printers, computers) are connected by one or more Ethernet switches. The Ethernet switches forward Ethernet frames, also referred to as L2 communications or L2 packets to devices within the network. As the Ethernet switches forward the Ethernet frames the Ethernet switches learn L2 state information for the L2 network, including media access control (MAC) addressing information for the devices within the network and the physical ports through which the devices are reachable. The Ethernet switches typically store the MAC addressing information in MAC tables. When forwarding an individual Ethernet frame, an ingress port of an Ethernet switch typically broadcasts the Ethernet frame to all of the other physical ports of the switch unless the Ethernet switch has learned the specific physical port through which the destination MAC address device is reachable. In this case, the Ethernet switch forwards a single copy of the Ethernet frame out the associated physical port.

Recently, network service providers have offered systems that provide L2 connectivity between multiple, geographically separate L2 customer networks. That is, the L2 customer networks may be interconnected by the service provider to provide L2 connectivity as if the L2 customer networks were directly connected. One mechanism by which network service providers provide L2 connectivity to their customers is by a virtual private local area network service (VPLS). VPLS may be used to extend two or more remote customer networks, i.e., VPLS sites, through a network (usually referred to as a provider network), such as the Internet, in a transparent manner, i.e., as if the network does not exist. In particular, the VPLS transports L2 communications, such as Ethernet packets, between customer networks via the network. In a typical configuration, routers coupled to the customer networks (such routers will be referred to as "members of the VPLS") define label switched paths (LSPs) that may be used as pseudowires within the provider network to carry encapsulated L2 communications as if these customer networks were directly attached to the same local area network (LAN).

Another type of large area L2 network connectivity is Provider Backbone Bridging (PBB) defined in accordance with IEEE standard 802.1ah. PBB defines architecture and bridging protocols in which a Provider Backbone Bridged Network (PBBN) provides L2 connectivity between multiple provider bridge networks (PBN) of one or more different network service providers.

SUMMARY

In general, this disclosure is directed to techniques for sharing, among network devices using multipoint network services, information identifying one or more L2 identifiers as static L2 network addresses. Static L2 network addresses associated with an interface of a network device, such as static MAC addresses, are persistently and locally maintained by the network device. Unlike dynamically-learned MAC addresses, static MAC addresses are manually configured at the network device and are not deleted upon expiration of a configured time period if no traffic is received having the MAC address by the network device during normal MAC flooding and learning processes (a process known as "aging out"). The techniques of this disclosure propose extensions for L2 multipoint network protocols, including as examples pure bridging protocols and VPLS signaling mechanisms, to propagate and synchronize static MAC address routes among network devices that are part of a bridge or VPLS. These networks may be generally referred to herein as LAN services and, by way of example, provide a multipoint Ethernet service environment. Thus, all network devices in the multipoint Ethernet service are made aware of the status of the MAC addresses as static MAC addresses, which can avoid inconsistent forwarding behavior for the static MAC address routes across the network devices.

In this manner, a remote network device can distinguish between MAC addresses that were dynamically learned by a peer network device when performing L2 functions, and those MAC addresses pre-configured on the peer network device as static MAC addresses. In this manner, the receiving network device may similarly treat the static MAC addresses as if the MAC addresses where statically configured on the network device rather than learned via a protocol, such as VPLS or a bridging protocol. For example, the receiving network device may not necessarily age out the MAC addresses from its MAC tables when those MAC addresses are actually static MAC addresses on the sending network device. This may result in less need for MAC address flooding and learning to occur in the multipoint Ethernet service environment. A mechanism is proposed for advertising the static MAC addresses across devices of the multipoint Ethernet service, identifying the MAC addresses as static MAC addresses by the advertisement.

In one example, a Border Gateway Protocol (BGP)-based virtual private local area network service (VPLS) may be used between provider edge (PE) routers of an autonomous system. In this example, this disclosure describes a new Border Gateway Protocol (BGP) Capability for static MAC address sharing mechanisms in BGP-based VPLS. For example, a new BGP message type is introduced herein to carry type-length-values (TLVs) that are used to instruct devices to add or remove static MAC addresses associated with an interface on which the BGP message is received. That is, the BGP protocol is extended to recognize a new VPLS static MAC address identification message format described herein. In BGP-based VPLS networks. BGP is used as the control plane protocol for VPLS service. The techniques described herein extend BGP by creating a new BGP Capability to allow BGP to also be used as the control plane protocol for carrying the VPLS static MAC address identification message.

Similar extensions are also proposed herein for Label Distribution Protocol (LDP)-based VPLS networks or LDP-based VPLS networks with BGP auto-discovery. For example, a new capability is also proposed for static MAC address sharing mechanisms in LDP-based VPLS. The new capability advertises the static MAC address in the LDP label mapping message through the support of a new TLV. The new TLV is similar to that described for BGP. In pure bridging networks, the techniques of this disclosure provide a new protocol that can be used to advertise the static MAC information between remote network devices using the bridging service.

The techniques of this disclosure may provide one or more advantages. For example, the techniques of this disclosure can provide remote network devices with control of the same behavior as the local network devices, such as flooding, learning, aging, and MAC moves. In addition, the techniques of this disclosure can also allow network devices to detect a problem if administrator(s) are attempting to configure the same MAC address as a static MAC on different interfaces of different network devices, which is not allowed. This can enhance security of the network.

In one example aspect, a method includes, by a first network device, receiving a control message at an interface of the first network device, wherein the control message is received from a second network device, wherein the first network device and the second network device use a multipoint service that provides layer two (L2) connectivity to transport L2 communications for a plurality of L2 networks through an intermediate network coupling the plurality of L2 networks, wherein the control message specifies one or more L2 addresses of network devices that are positioned within the L2 networks and reachable through the second network device, wherein the control message identifies the L2 addresses as static L2 addresses that are to be persistently maintained at the first network device as reachable by the interface. The method further includes, in response to receiving the control message and by the first network device, storing the L2 addresses as persistently maintained static L2 addresses being reachable by the interface of the first network device at which the control message was received.

In another example aspect, a method includes detecting a configuration update to one or more static L2 addresses configured on a first network device, and, in response to the detecting, originating and outputting to a second network device a control message that specifies the one or more static L2 addresses of network devices that are positioned within the L2 networks and reachable through the second network device, wherein the control message identifies the static L2 addresses as static L2 addresses that are to be persistently maintained at the second network device as reachable by an interface on which the second network device receives the control message, wherein the first network device and the second network device use a multipoint service that provides layer two (L2) connectivity to transport L2 communications for a plurality of L2 networks through an intermediate network coupling the plurality of L2 networks.

In another example aspect, a network device includes an interface for receiving a control message, wherein the control message is received from a second network device, wherein the network device and the second network device use a multipoint Ethernet service that provides layer two (L2) connectivity between L2 networks, wherein the control message specifies one or more L2 addresses of customer network devices that are provided connectivity to an autonomous system by the second network device, wherein the control message identifies the L2 addresses as static L2 addresses that are to be persistently maintained at the network device as reachable by the interface. The network device also includes a hardware-based processor for executing a static L2 address module that, in response to receiving the control message, stores the L2 addresses as persistently maintained static L2 addresses being reachable by the interface at which the control message was received.

In a further example aspect, a computer-readable storage medium includes instructions for causing a programmable processor to receive a control message at an interface of a first network device, wherein the control message is received from a second network device, wherein the first network device and the second network device use a multipoint service that provides layer two (L2) connectivity to transport L2 communications for a plurality of L2 networks through an intermediate network coupling the plurality of L2 networks, wherein the control message specifies one or more L2 addresses of customer network devices that are positioned within the L2 networks and reachable through the second network device, wherein the control message identifies the L2 addresses as static L2 addresses that are to be persistently maintained at the first network device as reachable by the interface. The instructions further cause the programmable processor to, in response to receiving the control message and by the first network device, store the L2 addresses as persistently maintained static L2 addresses being reachable by the interface of the first network device at which the control message was received.

The details of one or more examples are set forth in the accompanying drawings and the description below. Other features, objects, and advantages will be apparent from the description and drawings, and from the claims.

DETAILED DESCRIPTION

Figure 1:
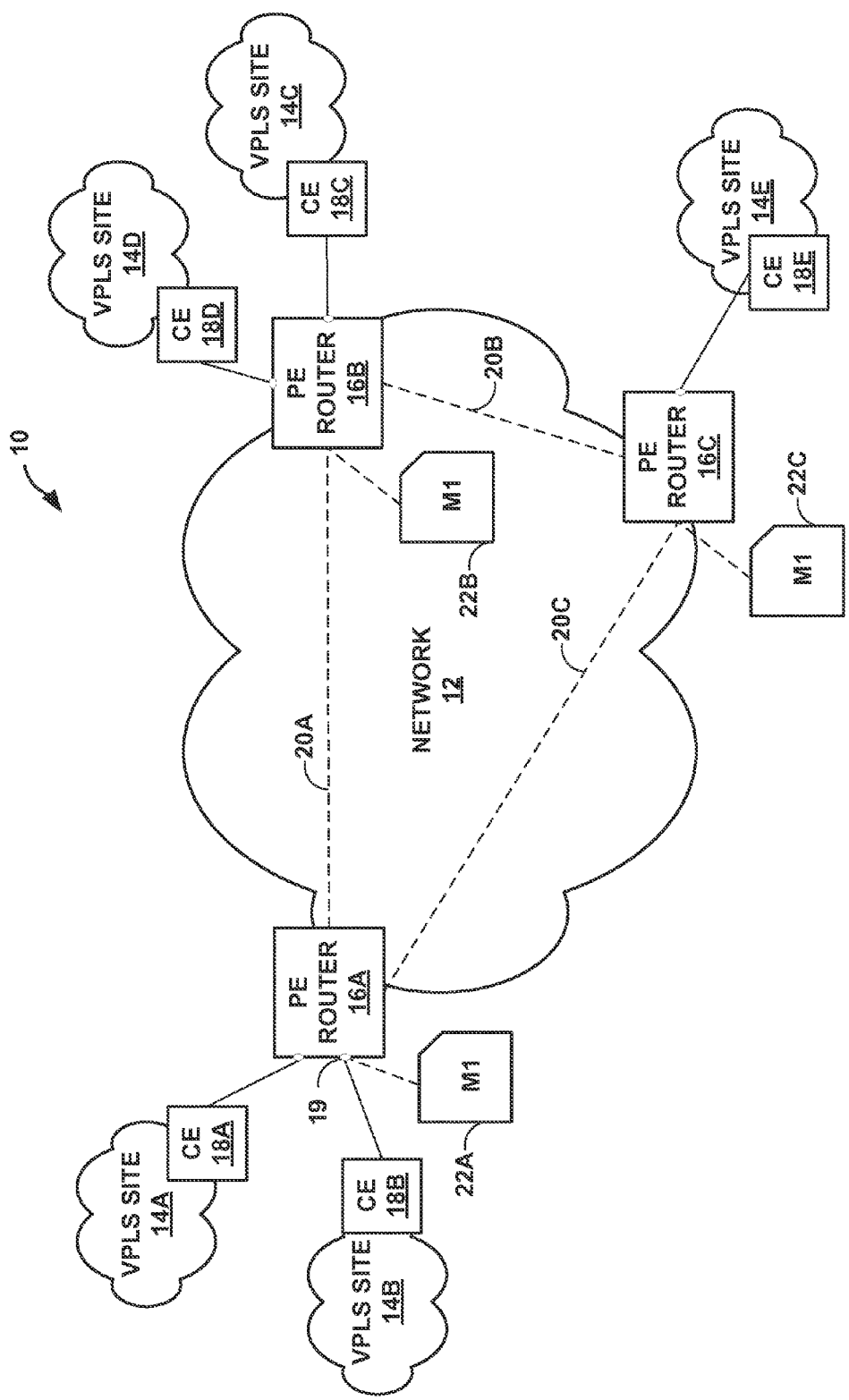
FIG. 1 is a block diagram illustrating an example service provider (SP) network that includes devices configured to employ a new static Media Access Control (MAC) address identification mechanism for multipoint Ethernet services.

FIG. 1 is a block diagram illustrating an example system 10 that includes a service provider (SP) network 12 that includes devices configured to employ a new static Media Access Control (MAC) address identification mechanism in a multipoint Ethernet service, such as a virtual private local area network service (VPLS). SP network 12 may comprise the Internet or other layer three (L3) network. In some cases, SP network 12 may comprise a multi-protocol label switching (MPLS) network that encapsulates and carries L2 traffic between VPLS sites 14A-14B ("VPLS sites 14") via bi-directional pseudowires 20A-20C ("pseudowires 20").

Each of VPLS sites 14 may include a local area network (LAN) that comprises a plurality of subscriber devices, such as desktop computers, laptops, workstations, PDAs, wireless devices, network-ready appliances, file servers, print servers or other devices. VPLS sites 14 may comprise private networks for different offices of a single enterprise.

As shown in FIG. 1, SP network 12 includes provider edge (PE) routers 16A-16C ("PE routers 16"). Each of PE routers 16 couples to one or more of VPLS sites 14 via customer edge (CE) devices 18A-18E ("CE devices 18"). For example, PE router 16A is coupled to VPLS site 14A via CE device 18A (e.g., a router or switch) and to VPLS site 14B via CE device 18B. PE router 16B is coupled to VPLS site 14C via CE device 18C and to VPLS site 14D via CE device 18D, and PE router 16C is coupled to VPLS site 14E via CE device 18E.

A VPLS domain established across SP network 12 extends the multipoint Ethernet connectivity of each VPLS site 14 so as to provide a large layer two (L2) network as if the LANs of VPLS sites 14 were directly connected. For example, the VPLS domain may transport layer two (L2) communications, such as Ethernet packets, between VPLS sites 14. That is, a VPLS domain may be used to extend VPLS sites 14 through SP network 12 in a transparent manner, i.e., as if SP network 12 does not exist. PE routers 16 may define label switched paths (LSPs) within SP network 12 to carry encapsulated L2 communications across SP network 12. The LSPs may be used as pseudowires (PWs) 20, for example, to emulate a L2 communication service, such as Ethernet, over SP network 12 in order to exchange encapsulated L2 communications, such as Ethernet packets, across SP network 12 as though devices of the VPLS sites were directly attached to the same local area network (LAN).

PE routers 16 that are members of the VPLS domain (also sometimes referred to herein as "VPLS PE routers") each maintain state for L2 identifiers, such as Media Access Control (MAC) addresses, learned from locally attached VPLS sites 14. In addition, each PE router 16 also maintains state for MAC addresses that belong to remote VPLS sites 14 that are attached to remote PE routers 16. PE routers 16 learn MAC addresses of remote VPLS sites 14 from L2 communications transported over pseudowires 20 established among PE routers 16.

In some cases, PE routers 16 provide mechanisms that allow an administrator to configure static MAC addresses (static MAC routes) on PE routers 16 for local devices within VPLS sites 14 to which the PE routers may be directly connected via multipoint Ethernet services. The administrator can configure static MAC addresses on a network device, such as PE router 16A, to reduce flooding by that network device across the network device's local L2 interfaces for the L2 domain and, thereby, speed up or even avoid the network device's automatic MAC learning process. In addition, there may be certain MAC addresses that an administrator may always want appear on a certain link (or interface), without allowing so-called "MAC moves," so the administrator may configure these locally as static MAC addresses for particular link.

In this way, static MAC addresses are persistently maintained on the network device, and are not aged out, nor are they changeable due to "MAC moves," that is, when it is detected that a MAC address moves from one VPLS site 14 to another. That is, static MAC addresses tie a MAC address to a particular MAC table for a local interface of a PE router 16, so that MAC moves to different interfaces are not allowed. PE router 16A, for example, is pre-configured with an entry for the static MAC address in its MAC tables even before PE router 16A receives a packet having that MAC address, so PE router 16A does not need to flood packets to that source MAC address. In this way, the configured static MAC addresses provide site administrators with some control on the local forwarding, MAC-moves, and other aspects for the customer VPLS sites 14 connecting to that PE router 16. Static MAC address manual configuration on service instances and pseudowires eliminates the need for MAC address learning. In the upstream direction, without needing to perform MAC address learning for the static MAC addresses, MAC address table resources can be conserved and network resources better used.

The administrator can specify one or more static MAC addresses for each interface 19 of PE router 16A, which may be a physical interface or a logical interface, e.g., a VLAN. For example, assume that a source MAC address of "M1" has been configured on PE router 16A as a static MAC address being associated with interface 19 of PE router 16A to CE router 18B. PE router 16A stores the MAC address M1 to a MAC table 22A associated with interface 19 of PE router 16A. For this configured static MAC address M1, PE router 16A will not perform MAC learning of the source MAC address M1 on a different interface if PE router 16A sees the source MAC address M1 "move" to the interface of PE router 16A to CE router 18A, i.e., receives traffic bearing a source MAC address M1 on the interface to CE router 18A.

The administrator can also specify various policies to be applied when a static MAC address is received on a different logical interface than the configured logical interface. For example, one such policy may specify that if a packet bearing a source MAC address that is configured as a static MAC address for a logical interface appears on a different logical interface, the packet may be dropped. As another example, the policy may additionally or alternatively raise an alert to an administrator upon seeing a static MAC address move to a different logical interface.

The techniques of this disclosure allow for sharing the configured static MAC address information with other PE routers on a multipoint Ethernet service, such as VPLS or provider bridging. In the absence of the techniques of this disclosure, the other PE routers 16B, 16C learn these MAC addresses, which are static MAC addresses on PE router 16A, by flooding and learning, and so the benefits of static MAC address configuration are not extended to multiple PE routers in the multipoint Ethernet service. That is, other PE router 16B, 16C may dynamically learn all MAC addresses reachable through PE router 16A via pseudowires 20A, 20C without regard to how the MAC addresses were learned by PE router 16A itself. The techniques of this disclosure provides the ability to extend the knowledge of which MAC addresses are configured on other PE router as static MAC addresses. This allows remote PE routers to potentially avoid extra flooding and learning, and allows the remote PE routers to apply the same policies as are applied on the local PE routers with respect to the static MAC addresses. This provides the remote PE routers with control of the same behavior as the local PE routers, such as flooding, learning, aging, and MAC moves. In addition, the techniques of this disclosure can also allow PE routers 16 to detect a problem if administrator(s) are attempting to configure the same MAC address as a static MAC on different interfaces of different PE routers, which is not allowed. This can enhance security of network 12.

The techniques of this disclosure allow PE routers 16 to generate messages to identify to other PE routers 16 those MAC addresses that were configured as static MAC addresses on the sending PE router 16. For example, PE router 16A can send messages to PE routers 16B, 16C identifying MAC address M1 as a static MAC address. PE router 16B can, in response to receiving the message, store MAC address M1 as a static MAC address to a MAC table 22B associated with pseudowire 22A on which the message was received. The static MAC address is thus associated with pseudowire 22A, in that PE router 16B now has information that MAC address M1 is reachable through pseudowire 22A to PE router 16A. Similarly, PE router 16C can, in response to receiving the message from PE router 16A, store MAC address M1 as a static MAC address to a MAC table 22C associated with pseudowire 22C on which the message was received. The static MAC address is thus associated with pseudowire 22C, in that PE router 16C now has information that MAC address M1 is reachable through pseudowire 22C to PE router 16A. This advertising of static MAC address information to remote PE router peers allows the receiving PE routers 16 to distinguish between MAC addresses learned dynamically by remote PE router 16 and MAC addresses that were configured as static MAC addresses on the remote PE router 16. In this manner, the receiving PE router 16 does not unnecessarily age out MAC addresses from its MAC tables that were actually static MAC addresses on the remote PE router, resulting in less need for MAC address flooding and learning to occur in the VPLS environment.

Similarly, if it is locally decided to remove a MAC address from its status as a static MAC address on PE router 16A, this information can also be propagated to the other PE routers 16 in the VPLS domain using the techniques of this disclosure. The remote PE routers 16 will update their MAC tables to remove the MAC address from the static MAC address list in certain situations, including receiving a message from PE router 16A withdrawing the MAC address as a static MAC address, or upon detecting that PE router 16A is down.

Two different mechanisms available for signaling and auto-discovery between PE routers for VPLS are using the Border Gateway Protocol (BGP), and using the Label Distribution Protocol (LDP), which are described by K. Kompella, "Virtual Private LAN Service (VPLS) Using BGP for Auto-Discovery and Signaling," Network Working Group RFC 4761, January 2007; and M. Lassarre, "Virtual Private LAN Service (VPLS) Using Label Distribution Protocol (LDP) Signaling," Network Working Group RFC 4762, January 2007, the entire contents of each of which being incorporated by reference herein. In BGP-based VPLS networks. BGP is used as the control plane protocol for VPLS service, and in LDP-based VPLS networks, LDP is used as the control plane protocol for VPLS service.

In some example aspects, the static MAC identification mechanism described herein may include extending VPLS control plane signaling protocol, (e.g., BGP or LDP) to include a new BGP or LDP capability, and configuring devices in SP network 12 with the ability to generate and process BGP VPLS static MAC identification messages. In some examples, according to the techniques of this disclosure, a protocol for extending an L2 domain through an intermediate transport network, such as the BGP protocol or the LDP protocol, is extended to recognize a static MAC identification messages as a new type of control plane signaling protocol message. The techniques described herein extend, for example, BGP to allow BGP to also be used as the control plane protocol for carrying static MAC identification messages. The techniques also modify a VPLS module, for example, executing on a control plane of a router to communicate with BGP or LDP executing on the control plane during generation and processing of static MAC identification messages.

Allowing the control plane signaling protocol to be re-used for the new function of static MAC identification in this manner may eliminate the need for service providers to deploy an entirely new protocol for static MAC identification. Using BGP for the MAC address flush mechanism may allow for efficiency by restricting the flow of routing messages to only the interested routers and autonomous systems by use of Route Target extended communities and Route Target constraints. For example, the static MAC identification message can be propagated to only those PE routers that would have received the NLRIs for the same Route Target that is carried in the static MAC identification message as well, both in intra-AS and inter-AS deployments. For more information about Route Target extended communities, see Sangli, S., et al., "BGP Extended Communities Attribute," IETF RFC 4360, February 2006 (hereinafter, "RFC 4360"), the entire contents of which is incorporated by reference herein. For more information about Route Target constraints, see Marques, P., et al., "Constrained Route Distribution for Border Gateway Protocol/MultiProtocol Label Switching (BGP/MPLS) Internet Protocol (IP) Virtual Private Networks (VPN)," IETF RFC 4684, November 2006, the entire contents of which is incorporated by reference herein.

A VPLS domain represents a bridging domain per customer. A Route Target community is used to identify all the PE routers participating in a particular VPLS domain. A service provider will therefore configure a unique Route Target for each customer. A source PE router is a VPLS PE router that originates either the VPLS NLRI or VPLS static MAC identification message. The source PE router address is carried in a Route Origin Extended Community. Use of this community for VPLS advertisements is described in Kompella, K., et al., "Multi-homing in BGP-based Virtual Private LAN Service," Nov. 3, 2008, Internet Draft, updates RFC 4761, the entire contents of which are incorporated by reference herein.

In some examples, PE routers 16 can advertise the VPLS static MAC identification capability to their BGP peers. To advertise the VPLS static MAC identification capability to a peer, PE routers 16 as BGP speakers can use a BGP Capabilities Advertisement. The BGP Capabilities Advertisement includes a Capability code that indicates the BGP speaker has the VPLS static MAC identification Capability. Further details relating to the BGP Capabilities Advertisement may be found in Scudder, J., et al, "Capabilities Advertisement with BGP-4," February 2009, RFC 5492, the entire contents of which are incorporated by reference herein. By advertising the VPLS static MAC identification Capability to a peer, a PE router 16 conveys to its peer that the PE router is capable of receiving and properly handling a VPLS static MAC identification message from the peer. A PE router 16 should send a VP VPLS static MAC identification Capability advertisement to a peer only if a BGP VPLS address family is also enabled and negotiated with the peer.

The extensions to multipoint Ethernet services, such as BGP-based or LDP-based VPLS described herein, allow PE router 16A to send a list of the MAC addresses belonging to VPLS site 14A or VPLS site 14B. This allows remote PE routers 16B and 16C to distinguish between MAC addresses that were dynamically learned by PE router 16A and MAC addresses that were configured as static MAC addresses on PE router 16A. As a result of being able to make this distinction, VPLS PE routers 16B and 16C can apply the same policies to static MAC addresses as are applied locally at PE router 16A, such as not aging out the static MAC addresses.

When a VPLS static MAC message is sent by PE router 16A, it can include all static MAC addresses configured on that network device, which may be for multiple interfaces associated with different CE devices. For example, a single VPLS static MAC message sent by PE router 16A may include static MAC addresses associated with CE 18A and CE 18B.

Figure 2:
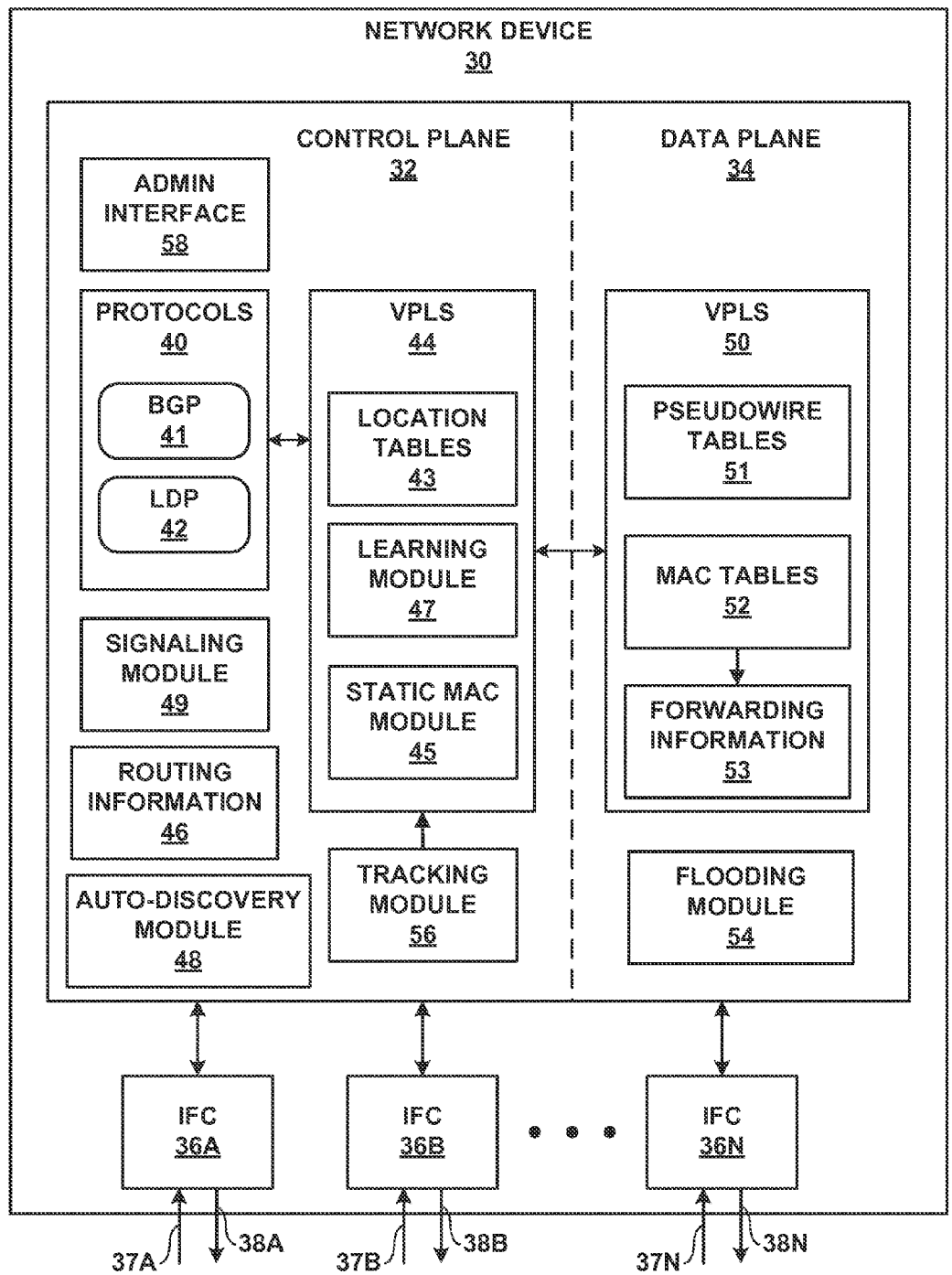
FIG. 2 is a block diagram illustrating an exemplary network device having the VPLS static MAC address identification capability described herein.

FIG. 2 is a block diagram illustrating an exemplary network device 30 having the static MAC identification capability described herein. Network device 30 may comprise a router, such as a PE router that uses static MAC identification techniques described herein, substantially similar to any of PE routers 16 of FIG. 1. Network device 30 may alternatively comprise a switch, or a routing device having switching functionality, including various devices represented in FIG. 8. Network device 30 includes interface cards 36A-36N ("IFCs 36") that receive control packets and data packets via inbound links 37A-37N ("inbound links 37") and send control packets and data packets via outbound links 38A-38N ("outbound links 38"). IFCs 36 are typically coupled to links 37, 38 via a number of interface ports. Network device 30 also includes a control plane 32 that determines routes of received packets and a data plane 34 that forwards the packets accordingly via IFCs 36.

Control plane 32 represents high-level control functions for network device 30 and typically provides routing protocols, device management and configuration functions and other administrative functions. For example, control plane 32 provides an operating environment for protocols 40 to execute, which may be software processes executing on one or more processors. In the illustrated embodiment, protocols 40 include the border gateway protocol (BGP) 41 as an exemplary routing protocol and the label distribution protocol (LDP) 42.

Control plane 32 maintains routing information 46. Routing information 46 describes the topology of a network and, in particular, routes through the network. Routing information 46 may include, for example, route data that describes various routes within a SP network, and corresponding next hop data indicating appropriate neighboring devices within the SP network for each of the routes. Protocols 40 (e.g., BGP module 41 and LDP module 42) executing within control plane 32 of network device 30 update routing information 46 to accurately reflect the topology of the autonomous system in which network device 30 resides as well as label distributions utilized by network device 30. Control plane 32 generates and maintains forwarding information 53 within data plane 34 based on routing information 46. Typically, control plane 32 generates forwarding information 53 in the form of a radix tree to map packet information (e.g., header information having destination information and/or a label stack) to next hops and ultimately to interface ports of IFCs 36.

Data plane 34 represent hardware and logic functions that provide high-speed forwarding of network traffic. Data plane 34 maintains forwarding information 53 for each VPLS domain established by network device 30 to associate network destinations with specific next hops and the corresponding interface ports. In general, when network device 30 receives a data packet on a pseudowire of a given L2 domain via one of inbound links 37, data plane 34 identifies an associated next hop for the data packet by traversing forwarding information 53 based on information (e.g., labeling information) within the packet. Data plane 34 forwards the data packet on one of outbound links 38 to the corresponding next hop in accordance with forwarding information 53 associated with the VPLS domain. At this time, data plane may push and/or pop labels from the packet to forward the packet along a correct pseudowire.

Control plane 32 also includes a VPLS module 44 having learning module 47 that performs L2 learning, e.g., learning of customer device MAC addresses from inbound PWs and association of those customer MAC addresses with corresponding outbound PWs and output interfaces. VPLS module 44 maintains location tables 43 for each VPLS instance established by network device 30. Learning module 47 may alternatively reside within data plane 34.

A tracking module 56 included in control plane 32 updates location tables 43. Control plane 32 also includes an auto-discovery module 48 and a signaling module 49. Data plane 34 includes a VPLS module 50 capable of communicating with VPLS module 44. VPLS module 50 maintains pseudowire tables 51, MAC tables 52 and forwarding information 52 for each VPLS established by network device 30. For example, VPLS module 50 maintains MAC tables 52 to reflect state information learned via layer 2 communications. In accordance with the techniques of this disclosure, MAC tables 52 may also include static MAC address information learned via local configuration or through receipt of a VPLS signaling message that includes the static MAC information received from another member of the VPLS domain. MAC tables 52 may be a set of individual MAC tables each associated with a different interface (e.g., physical port) of network device 30.

Auto-discovery module 48 performs auto-discovery to determine which network devices within the network or autonomous system are members of a given VPLS. Auto-discovery module 48 sends control messages via outbound links 38 to all the PE routers and border routers in the AS. Auto-discovery module 48 may send the control messages using a reliable transport protocol, such as BGP module 41. The control messages between network device 30 in the AS and the PE routers in the AS may comprise internal BGP (iBGP) messages. In some aspects, the control messages between network device 30 in the AS and a border router and PE routers in a second AS may comprise external BGP (eBGP) messages so as to allow autonomous system border routers (ASBRs) participating in an inter-AS VPLS instance (e.g., two or more ASBRs) to automatically discover each other and exchange VPLS site ID via eBGP advertisements.

Signaling module 49 outputs control-plane messages to automatically establish pseudowires between network device 30 and each of the PE routers in the SP network based on the one of location tables 43 associated with the VPLS. Signaling module 49 may signal the PE routers using a label distribution protocol, such as LDP 42. Signaling module 49 then communicates with VPLS module 50 to automatically update the one of pseudowire tables 51 associated with the VPLS within VPLS module 50.

VPLS module 50 included in data plane 34 performs MAC address learning to automatically update portions of forwarding information 53 for each VPLS established by network device 30. As part of data plane 34, VPLS module 50 is invoked when network device 30 receives data packets on the pseudowires (PWs) established by network device 30 for any of the PE routers in the SP network that are members of the VPLS domain. VPLS module 50 performs MAC address learning and updates the one of MAC tables 52 associated with the VPLS domain to initially record associations between the PWs connected to network device 30 and the source MAC addresses of the VPLS customer devices from which the data packets were received on the PWs. For example, the one of MAC tables 52 records PW numbers that identify the PWs connected to network device 30 and records MAC addresses that identify the source customer devices attached to the first AS of the data packets transmitted over the PWs. In effect, network device 30, a L3 device, learns associations between MAC address and pseudowires (which are mapped to ports), much as a L2 switch learns associations between MAC addresses and ports. Forwarding information 53 may represent a virtual port binding and bridging table. In this sense, the router is acting as a virtual L2 switch to provide VPLS service.

In order to update the one of the MAC tables 52, learning module 47 of VPLS module 44 in control plane 32 performs L2 learning and association of L2 customer MAC addresses with specific PWs. Learning module 47 then communicates information recorded in the one of location tables 43 that is associated with the VPLS instance to VPLS module 50 in data plane 34. In this way, VPLS module 50 may be programmed with associations between each PW and output interface and specific source customer MAC addresses reachable via those PWs. VPLS module 50 updates the one of MAC tables 52 associated with the VPLS to associate the customer MAC addresses with the appropriate outbound PW. After the update, the one of MAC tables 52 associated with this particular VPLS instance records associations between the PWs connected to network device 30 that are used to transport L2 traffic to the MAC addresses of the customer devices within the VPLS sites of the VPLS instance. In other words, the one of MAC tables 52 for this VPLS instance records associations between the PWs and the network devices to which data packets may be sent on the PWs. For example, the one of MAC tables 52 records PW numbers that identify the PWs sourced by network device 30, and for those PW numbers identifies the MAC addresses of the reachable customer devices within the VPLS instance.

Network device 30 receives data packets on inbound links 37 that are destined for one of the PE routers in the SP network that are members of the VPLS. VPLS module 50 of network device 30, in the data plane 34, determines whether the destination customer MAC address of the data packets is included in the one of MAC tables 52 associated with the VPLS. The MAC addresses of MAC tables 52 that are configured as static MAC addresses will already be present in MAC tables 52 when network device 30 receives data packets. If the MAC address is included in the one of MAC tables then network device 30 forwards the data packets to the destination PE router on the PW associated with the MAC address based on forwarding information 53 associated with the VPLS. If the customer MAC address is not included in the one of MAC tables 52 then flooding module 54 floods the data packets to all of the PE routers in the AS via the PWs based on forwarding information 53 associated with the VPLS.

In the case the VPLS is an inter-AS VPLS, flooding module 54 also floods the data packets to the border router in the second AS based on forwarding information 53 associated with the VPLS. Upon receiving the data packets, the border router in the second AS is responsible for forwarding or flooding the data packet to the PE routers in the second AS that are members of the inter-AS VPLS.

Static MAC addresses associated with different customer devices and/or logical interfaces of network device 30 may be manually configured on network device 30 by an administrator via administrator interface ("ADMIN INTERFACE") 58 of control plane 32. The static MAC addresses can be stored in MAC tables 52. An administrator may also configure policies on network device 30 via admin interface 58 that specify how network device 32 will handle network traffic having one of the static MAC addresses as the source address, that is received on a different interface than the statically configured interface. For example, the policies may specify to drop such traffic without acknowledging a "MAC move" and without modifying the stored interface associated with the static MAC address.

Upon receiving configuration updates to the static MAC addresses via admin interface 58, static MAC module 45 may trigger a control message to be sent by network device 30. To identify a particular set of MAC addresses as static MAC addresses to a peer router, network device 30 can originate a VPLS static MAC identification message with a TLV field that contains a set of one or more MAC addresses that need to be stored by the receiving PE router as persistent static MAC addresses relative to network device 30. As one example, network device 30 may create and send a VPLS static MAC message to other PE routers in a VPLS domain each time a change is made to static MAC address configuration on network device 30 via admin interface 58, such as changes adding or removing static MAC addresses. In other examples, network device 30 may create and send a VPLS static MAC message to other PE routers in at predefined time intervals, where the VPLS static MAC message includes any configuration changes that have occurred since the last time a VPLS static MAC message was sent by network device 30. Network device 30 can send a VPLS static MAC message that specifies zero static MAC addresses, which can be interpreted by the receiving PE router as an indication to withdraw all static MAC addresses formerly received and stored in association with network device 30. Further details of the operation of network device 30 are explained below with respect to FIGS. 5-7.

Topology changes either in a service provider's network (e.g., SP network 12) or in a customer's network (e.g., VPLS sites 14) can result in the movement of MAC addresses from one PE router to another. In the absence of the techniques described herein for static MAC identification, such events might result in PE network device 30 erroneously moving MAC addresses that are actually static MAC addresses on the original PE router to the new PE router, when in fact such a MAC move is not meant to occur. In addition, PE network device 30 might include age-out timers that cause VPLS module 50 to clear stale state from MAC tables 52, such as by deleting those MAC addresses for which no traffic has been received in a given time period. In the absence of the techniques described herein for static MAC identification, MAC addresses that are actually configured as static MAC addresses on the original PE router might be aged out on network device 30 if they are not properly recognized at network device 30 as having the status of static MAC addresses. To handle this, and extend the benefits of static MAC addresses to the multipoint Ethernet service (e.g., VPLS) context, PE network device 30 is configured with a VPLS static MAC identification Capability to allow for identification of static MAC addresses as such between remote PE routers in the VPLS domain. As described in detail below, BGP module 41, LDP module 42, VPLS module 44, and VPLS module 50 are extended to enable the VPLS static MAC identification Capability and to allow network device 30 to generate and/or process new BGP VPLS static MAC identification messages or LDP VPLS static MAC identification messages, depending on the signaling protocol being used for VPLS.

Network device 30 uses a VPLS static MAC identification Capability to negotiate the use of VPLS static MAC identification message for static MAC identification. For example, when network device 30 is willing to receive a VPLS static MAC identification message from its peers, network device 30 can advertise the VPLS static MAC identification Capability to its BGP peers. For example, BGP module 41 may cause signaling module 49 to advertise a BGP Capabilities Advertisement that indicates the VPLS static MAC identification Capability. Conversely, network device 30 may, in some examples, send a VPLS static MAC identification message to a BGP peer only if network device 30 has received the VPLS static MAC identification capability from the BGP peer. In other examples, network device 30 may not use capability announcements, but may simply send a VPLS static MAC identification message without knowing whether its peers have similar capabilities to handle static MAC identification.

In the event that network device 30 receives a VPLS-FLUSH message without any Route Targets, network device 30 may neither process nor propagate the VPLS-FLUSH message. Network device 30 should not do BGP or VPLS path selection for VPLS-FLUSH messages. Network device 30 might receive the same VPLS-FLUSH message from a source PE router more than once due to presence of RRs or ASBRs in the network. Network device 30 can use the sequence number field of the VPLS-FLUSH messages to detect duplicate VPLS-FLUSH messages. In some embodiments, PE network device 30 may ignore duplicate VPLS-FLUSH messages. Other than state to detect duplicate flush messages, PE network device 30 should hold no other permanent state associated with the VPLS-FLUSH messages.

The architecture of network device 30 illustrated in FIG. 2 is shown for exemplary purposes only. The disclosure is not limited to this architecture. In other embodiments, network device 30 may be configured in a variety of ways. In one embodiment, for example, some of the functionally of control plane 32 and data plane 34 may be distributed within IFCs 36. In another embodiment, control plane 32 may include a routing engine that performs routing functions and maintains routing information base (RIB), e.g., routing information 46, and data plane 34 may include a forwarding engine that performs packet forwarding based on a forwarding information base (FIB), e.g., forwarding information 53, generated in accordance with the RIB and MAC tables 52.

Control plane 32 and data plane 34 may be implemented solely in software, or hardware, or may be implemented as combinations of software, hardware, or firmware. For example, control plane 32 and data plane 34 may include one or more processors which execute software instructions. In that case, the various software modules of control plane 32 and data plane 34 may comprise executable instructions stored, embodied, or encoded in a computer-readable medium, such as a computer-readable storage medium or computer-readable storage device, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable media.

Figure 3:
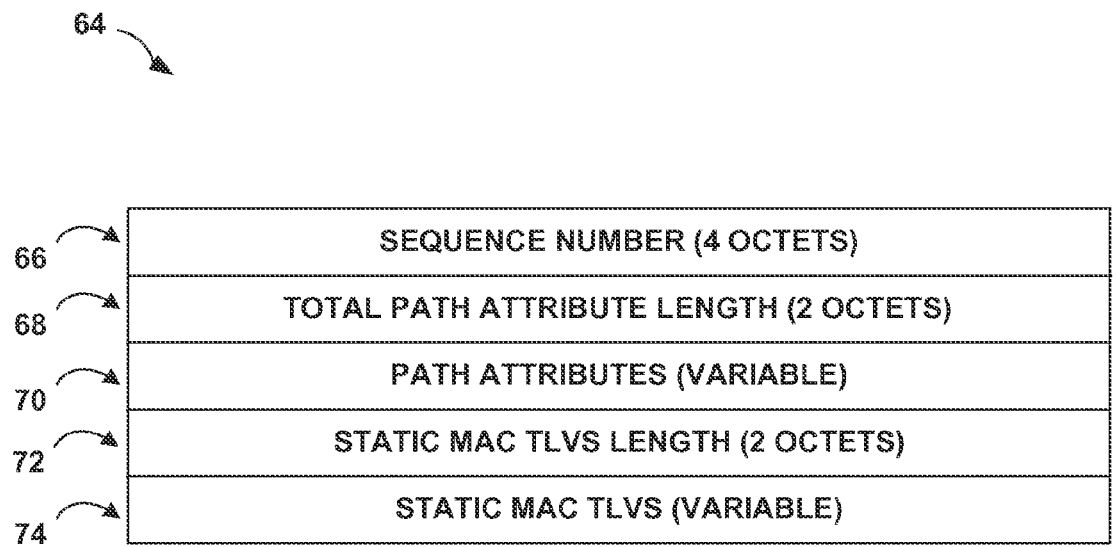
FIG. 3 is a block diagram illustrating an exemplary message format for a VPLS static MAC identification message.

FIG. 3 is a block diagram illustrating an exemplary message format 64 of a VPLS static MAC identification message. VPLS static MAC identification messages may be a new type of BGP or LDP message defined herein, which the BGP protocol or LDP protocol can be extended to recognize according to the techniques of this disclosure. FIG. 3 will be described below relative to BGP, but similar aspects may apply in the context of LDP. In the example of LDP, the VPLS static MAC identification message may involve a new TLV contained in an LDP label map message.

The VPLS static MAC identification message can also include a fixed size BGP header (not shown). In the example of FIG. 3, the VPLS static MAC identification message format 64 includes the following fields: a Sequence Number field 66, a Total Attribute Length field 68, a Path Attributes field 70, a VPLS static MAC identification TLVs Length field 72, and a VPLS static MAC identification TLVs field 74.

The Sequence Number field 66 includes a 4-octets unsigned integer that indicates the current sequence number of the VPLS static MAC identification message being sent to remote VPLS PE routers. The Total Attribute Length field 68 includes a 2-octets unsigned integer that indicates the total length of the Path Attributes field 70 in octets. The value of the integer of the Total Attribute Length field 68 will be greater than 0, which implies that at least one attribute must be present.

The Path Attributes field 70 includes a variable length sequence of path attributes that are present in VPLS static MAC identification messages. The following attributes are present: Route Target Community; AS-PATH Attribute; ORIGINATOR_ID Attribute; CLUSTER_LIST Attribute; Route Origin Extended Community. The AS-PATH, ORIGINATOR_ID and CLUSTER_LIST attributes are processed and updated as in routing messages, and are present to ensure VPLS static MAC identification messages do not result in a loop. The VPLS static MAC identification TLVs Length field 72 includes a 2-octets unsigned integer that indicates the total length of the VPLS static MAC identification TLVs field in octets. The value of the integer must be greater than 0.

The VPLS static MAC identification TLVs field 74 is a variable length field that contains a list of TLVs that indicates those L2 addresses (e.g., MAC addresses) to be stored as static L2 addresses based on the value contained in each TLV. Each TLV is a triple <type, length, value> of variable length. The type is a 2-octet field that identifies one of the possible TLVs defined. Length is a 2-octet field that indicates the TLV value length. Value is of variable length and is encoded according to the TLV type. The VPLS static MAC identification message format is an extensible message format, meaning that other TLV types may be defined. If a VPLS PE router receives a VPLS static MAC identification message that contains a TLV type that the VPLS PE router does not understand, the VPLS PE router should ignore that TLV alone. The Type is a 2-octet field. A type of "0" may mean a MAC list TLV. Different TLV types can be defined to identify static MAC addresses based on the L2 technology in use for a VPLS domain. For example, in addition to being useful in IP/MPLS networks using BGP-based VPLS or LDP-based VPLS, the VPLS static MAC identification mechanisms described herein may be used in Provider Backbone Bridging (PBB) architectures, where static MAC identification may be desirable in the context of Service Instance VLAN Identifiers (I-SIDs). Other TLV types may correspond to, for example, a VLAN identifier TLV, and an I-SID TLV, or other type of TLV.

Figure 4:
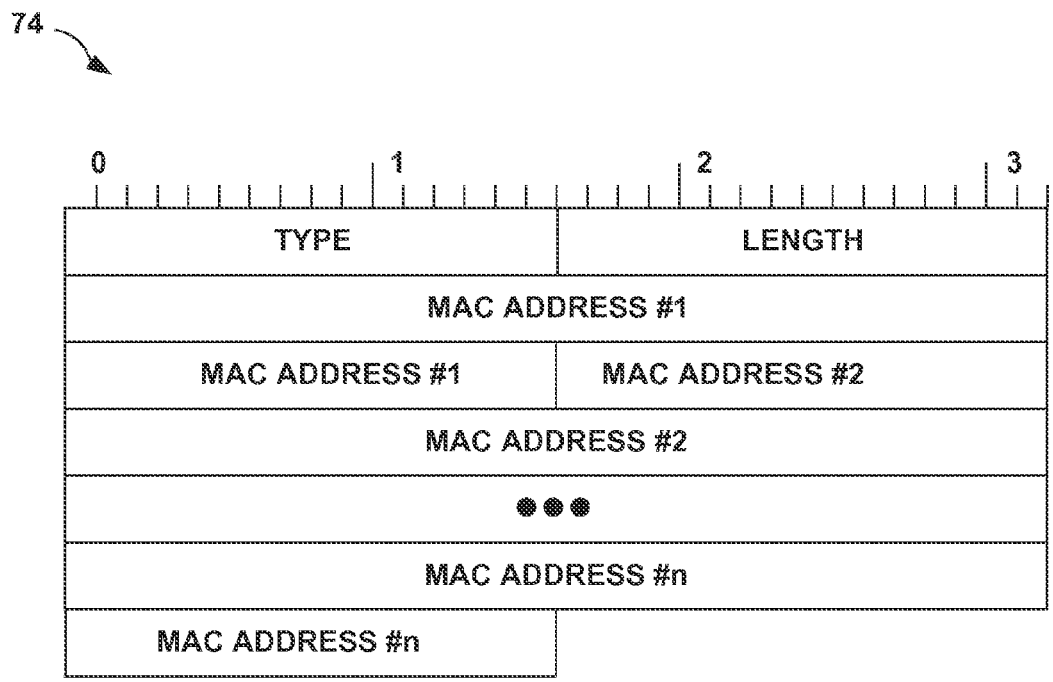
FIG. 4 is a block diagram illustrating an exemplary VPLS static MAC identification TLV field in further detail.

FIG. 4 is a block diagram illustrating an exemplary VPLS static MAC identification TLV field 74 in further detail. In the example of FIG. 4, the VPLS static MAC identification TLV field comprises a MAC list TLV. In one embodiment, a Type of 0 indicates that the TLV contains a list of 48-bit MAC addresses that should each be stored as static MAC addresses associated with the originating network device by the PE router that processes the VPLS static MAC identification message. The source PE router can be indicated by Route Origin Extended Community, for example.

The length field specifies the total length in octets of the MAC addresses present in the TLV. If the length is 0, which indicates that no MAC addresses are present, then this informs the receiving PE router that all static MAC addresses learned from the source PE router should be flushed. The length will be a multiple of 6. The encoding for MAC list is as follows: A VPLS PE router that receives a VPLS static MAC identification message with a MAC list TLV should add each static MAC address listed in the TLV that it learned from the source VPLS PE router for the VPLS domain specified by the Route Target, if these static MAC addresses are not already stored as such.

The BGP signaled VPLS may use any other alternate mechanism available, such as an Extended Community. A PE router 16 can use a "STATIC MAC EXTENDED COMMUNITY", and one such static-MAC extended community can be attached to the BGP route for each local static MAC address.

Figure 5:
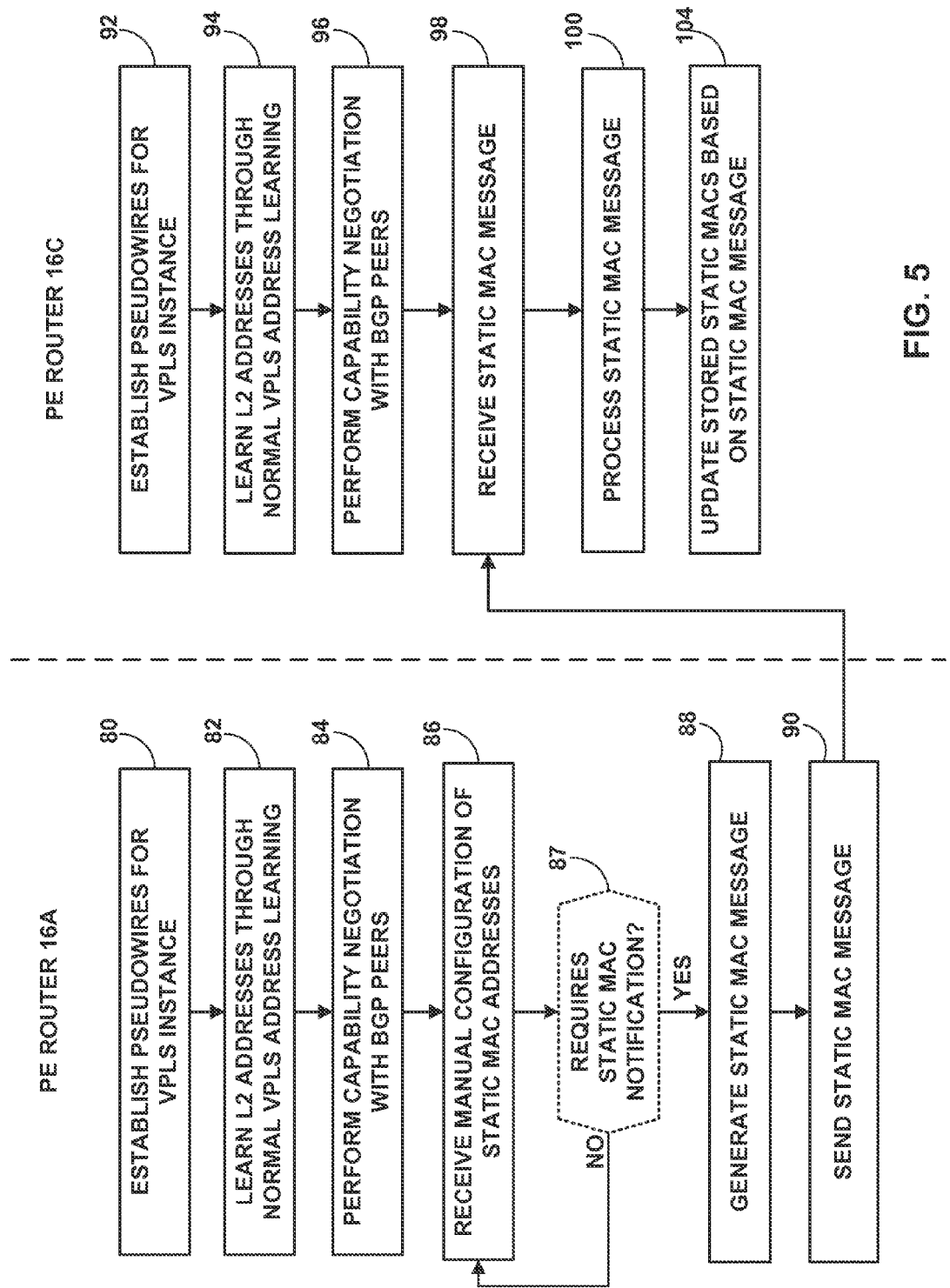
FIG. 5 is a flowchart illustrating an example mode of operation of routers in a network in using the VPLS static MAC identification mechanisms described herein.

FIG. 5 is a flowchart illustrating an example mode of operation of routers in a network in using the VPLS static MAC identification mechanisms described herein. FIG. 5 will be described for purposes of example in terms of FIGS. 1 and 2. Although described for purposes of example with respect to BGP-based VPLS, similar steps may be performed in the context of other multipoint Ethernet services, such as LDP-based VPLS, LDP-based VPLS with BGP auto-discovery, or multipoint bridging.

PE router 16A establishes pseudowires for connectivity with VPLS sites 14A and 14B for a VPLS instance (80). PE router 16A performs VPLS address learning to learn L2 addresses (e.g., MAC addresses) associated with local and remote VPLS sites (82). In addition. PE router 16A performs capabilities negotiation with BGP peers (84). That is, PE router 16A advertises the VPLS static MAC identification Capability to BGP peers using a BGP Capabilities Advertisement, and may receive BGP Capabilities Advertisements from BGP peers that also indicate the VPLS static MAC identification Capability. In some cases, a service provider may configure most or all PE routers 16 within network 10 to be VPLS static MAC identification capable.

PE router 16A may receive a change in static MAC address configuration, such as by a site administrator manually adding or removing static MAC addresses via admin interface 58 (86). In some aspects, static MAC module 45 of VPLS module 44 may optionally consult location tables 43 to determine whether a VPLS static MAC identification message is required by the change (87). When static MAC module 45 determines that a VPLS static MAC identification message is required by the change, or alternatively after receiving any manual configuration change, PE router 16A generates a VPLS static MAC identification message to identify particular L2 addresses as being static MAC addresses on PE router 16A (88). PE router 16A sends the VPLS static MAC identification message to devices within network 12 (90).

In addition. PE router 16C may, in a manner similar to that of PE router 16A, establish pseudowires for connectivity with VPLS customer sites for a VPLS instance, e.g., VPLS site 14D (92), learn L2 addresses through VPLS learning (94), and perform capability negotiation with BGP peers (96). For example, PE routers 16A, 16B, and 16C may exchange BGP Capability advertisements.

PE router 16C receives the VPLS static MAC identification message from PE router 16A (potentially via an intermediate network device of network 12, such as a route reflector), (98). PE router 16C processes the VPLS static MAC identification message (100). If needed, PE router 16C makes an update to the stored static MAC addresses of MAC tables 52 as specified in the TLVs of the VPLS static MAC identification message (104).

Figure 6:
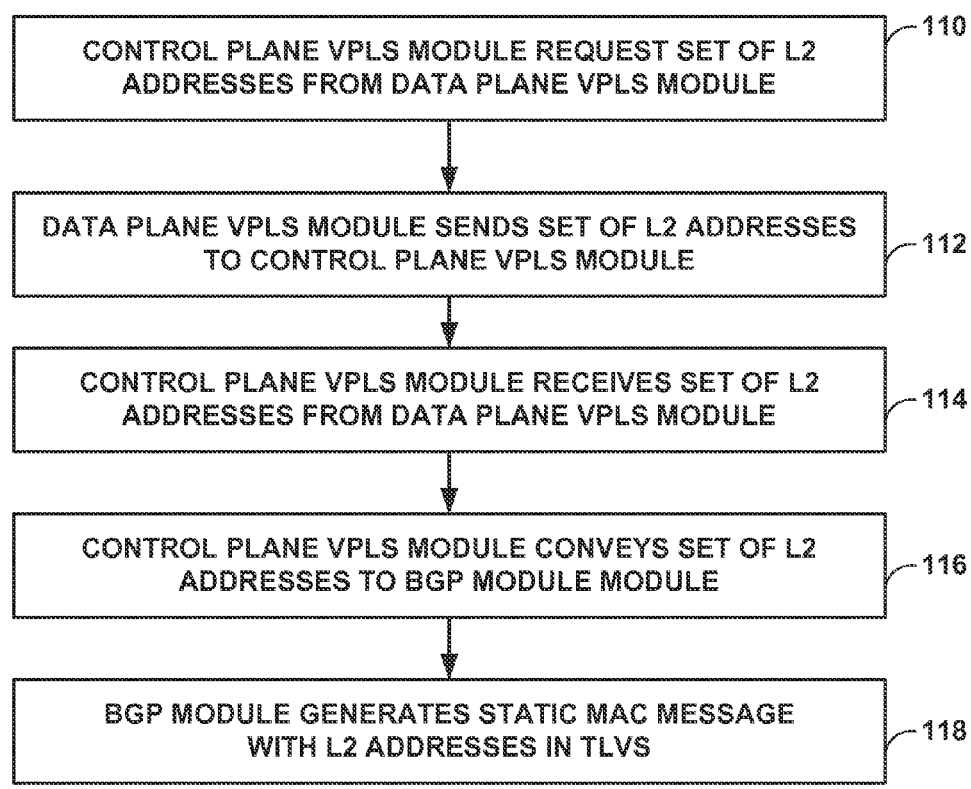
FIG. 6 is a flowchart illustrating example operation of a PE router in generating a VPLS static MAC identification message.

FIG. 6 is a flowchart illustrating example operation of PE router 16A (FIG. 1) in generating a VPLS static MAC identification message (step 88 of FIG. 5). Although described for purposes of example with respect to BGP-based VPLS, similar steps may apply to the context of other multipoint Ethernet services, such as LDP-based VPLS or multipoint bridging. In response to static MAC module 45 receive a change in static MAC address configuration, VPLS module 44 of control plane 32 requests the VPLS module 50 of data plane 34 to convey a set of static L2 addresses (e.g., static MAC addresses) from VPLS 50 of data plane 34 to VPLS module 44 of control plane 32 (110). In addition, when VPLS module 44 or one of protocols 40 detects a new neighbor, VPLS module 44 may also trigger a request to VPLS module 50 for the static MAC addresses. Data plane VPLS module 50 sends the set of static MAC addresses obtained from MAC tables 52 to control plane VPLS module 44 based on the request (112).

Control plane VPLS module 44 receives the set of static MAC addresses from data plane VPLS module 50 (114). VPLS module 44 conveys the set of static MAC addresses to BGP module 41 (116), which generates a VPLS static MAC identification message having a static MAC list TLV that contains the set of static MAC addresses to be identified (118). BGP module 41 originates the VPLS static MAC identification message for a particular VPLS domain. BGP module 41 may use Route Target Extended Communities to identify the VPLS domain with which the VPLS static MAC identification message is associated. The use of Route Target Extended Communities also limits the flooding of the VPLS static MAC identification message to the member PE routers of the VPLS domain.

Figure 7:
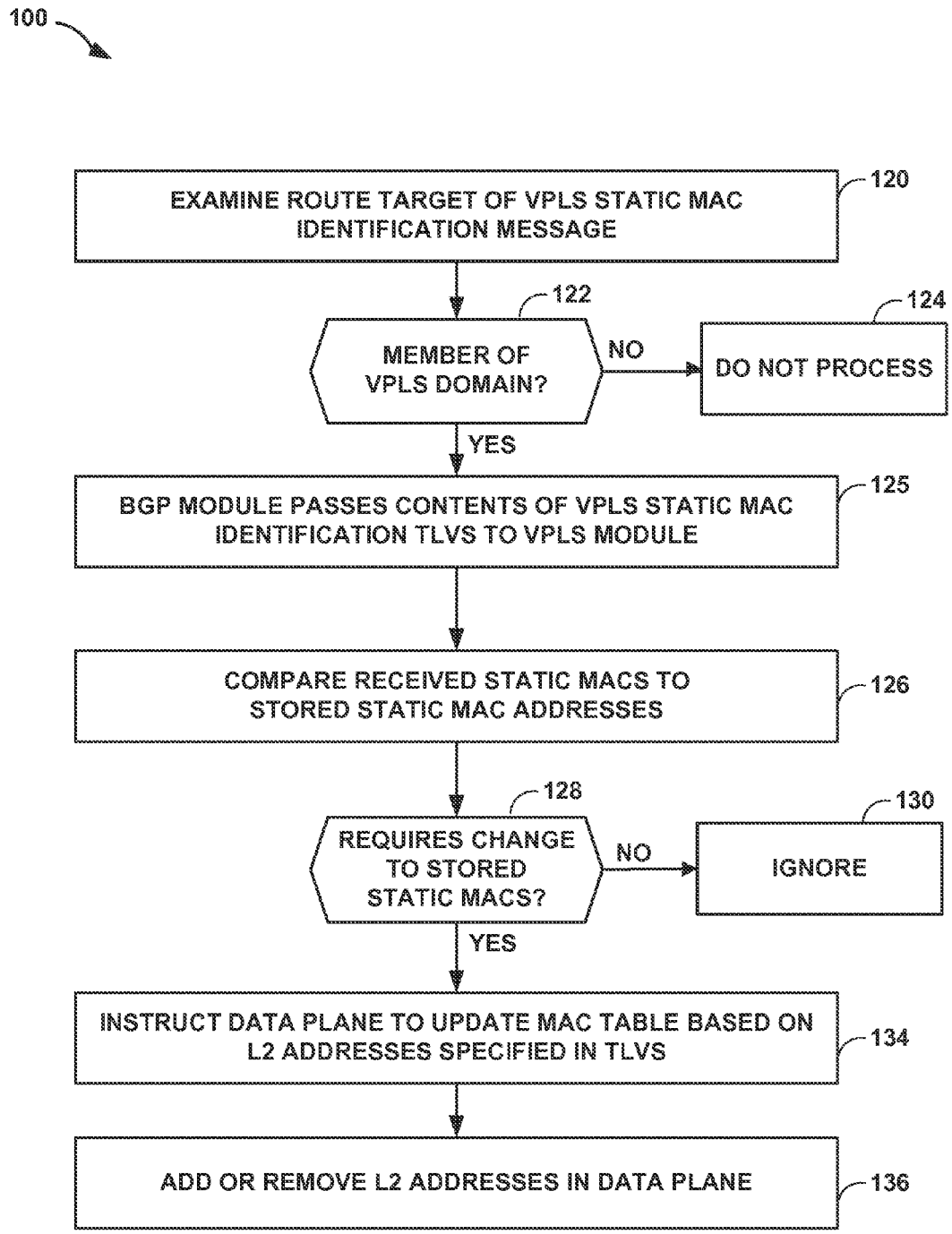
FIG. 7 is a flowchart illustrating example operation of a PE router in processing a received VPLS static MAC identification message.

FIG. 7 is a flowchart illustrating example operation of PE router 16C (FIG. 1) in processing a received VPLS static MAC identification message (step 100 of FIG. 5). Although described for purposes of example with respect to BGP-based VPLS, similar steps may apply to the context of other multipoint Ethernet services, such as LDP-based VPLS or multipoint bridging. When PE router 16C receives a VPLS static MAC identification message sent by another PE router, BGP module 41 examines the VPLS static MAC identification message (120) to determine whether the Route Targets carried by the VPLS static MAC identification message indicate a VPLS domain with which PE router 16C is a member (122). A receiving PE router should only process TLVs for the VPLS static MAC identification message that have a Route Target that matches one of the VPLS instance configured on PE router 16C. Thus, if PE router 16C is not a member of the VPLS domain associated with the VPLS static MAC identification message, PE router 16C does not process the VPLS static MAC identification message (124). PE router 16C should not do BGP or VPLS path selection for VPLS static MAC identification messages. If PE router 16C is a member of the VPLS domain associated with the VPLS static MAC identification message. BGP module 41 passes the contents of the MAC list TLVs to VPLS module 44 in the control plane 32, e.g., to static MAC module 45 of VPLS module 44 (125).

For example, static MAC module 45 may compare the listed static MAC addresses in the VPLS static MAC identification message to stored MAC tables 52 to determine whether it is necessary to add or remove any static MAC addresses to the MAC tables 52 (128). If no changes are necessary, static MAC module 45 may ignore the VPLS static MAC identification message (130). If changes are needed, static MAC module 45 instructs VPLS module 50 in data plane 34 to update the MAC table 52 based on the MAC addresses listed in the MAC list TLVs (134). VPLS module 50 then updates the specified MAC addresses from MAC tables 52 (136), such as by adding or removing MAC addresses.

Figure 8:
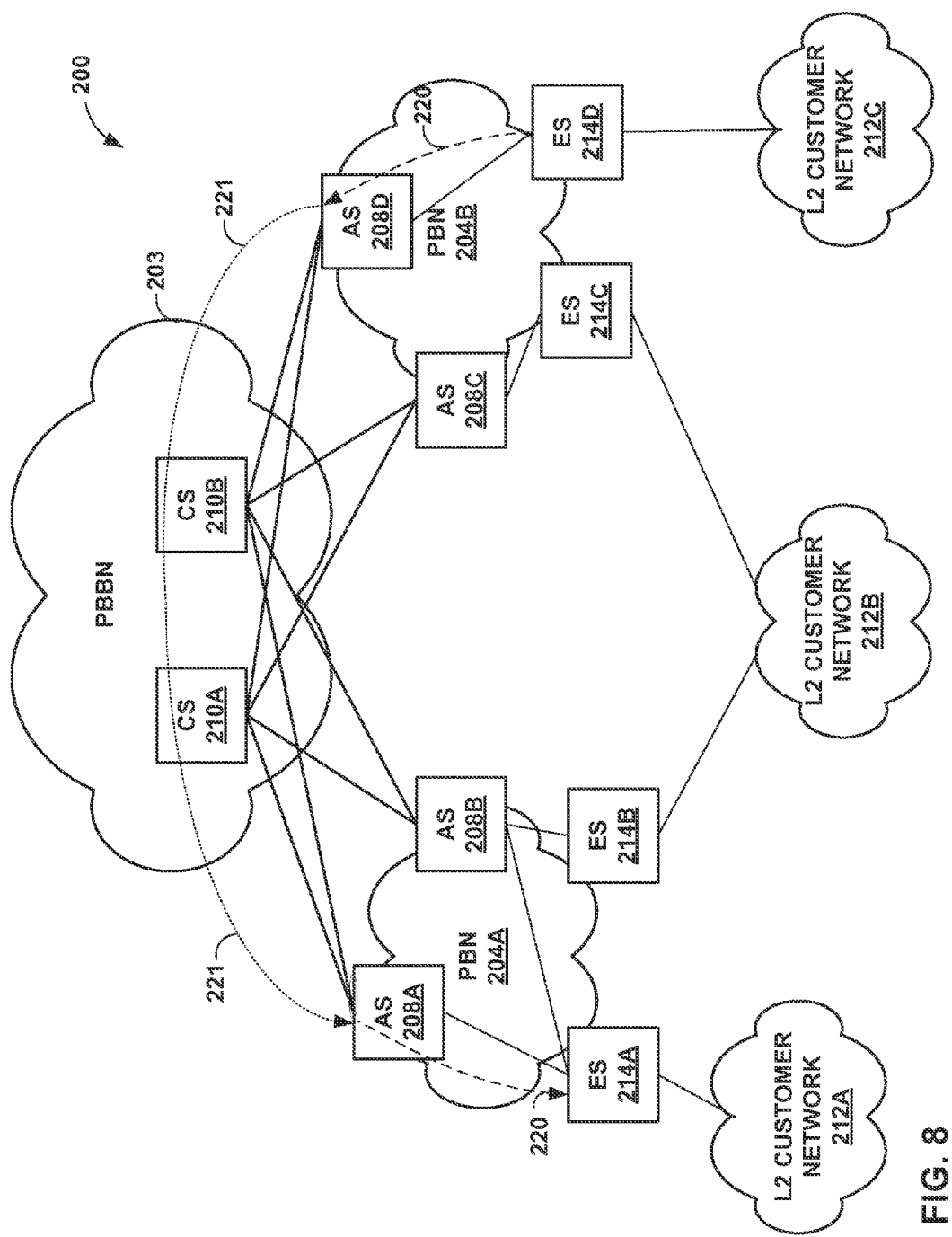
FIG. 8 is a block diagram illustrating an example network in which a Provider Backbone Bridged Network (PBBN) provides L2 connectivity between multiple provider bridge networks (PBN).

FIG. 8 is a block diagram illustrating an example network 200 in which a Provider Backbone Bridged Network (PBBN) 203 provides L2 connectivity between multiple provider bridge networks (PBN) 204A, 204B (collectively, "PBNs 204"). Each of PBNs 204 represents a component and infrastructure of a service provider that provide bridged local area network services to L2 customer networks. Each PBN 204 provides one or more service VLANs ("S-VLANS) to service and isolate L2 traffic from L2 customer networks 12. PBNs 204 may be L2 bridging networks provided by the same network service provider or by one or more different service providers.

In the example of FIG. 7, each of PBNs 204 includes one or more access switches 6 that connect the PBN to core switches within PBBN 2. In the example of FIG. 7, access switch (AS) 208A and AS 208B provide L2 connectivity to core switches (CS) 210A, 2210B. Similarly, AS 208C and AS 208D provide L2 connectivity to CS 210A and CS 210B. PBBN 203 is composed of a set of Backbone Edge Bridges (BEBs) provided by backbone-facing components of access switches 8. That is, each of AS 208A-AS 208D provides a BEB for bridging to the backbone domain of PBBN 203. Each BEB provides interfaces that encapsulate (or verifies the encapsulation of) customer frames, thus allowing customer MAC (C-MAC) addresses and VLANs to be independent of the backbone MAC (B-MAC) addresses and VLANs administered by the PBBN operator.

In this way, each of PBNs 204 provide L2 bridging connectivity for one or more of L2 customer networks 212A, 212B and 212C. In this example, L2 customer network 212A is coupled to PBN 204A by an edge switch (ES) 214A. L2 customer network 212B is coupled to PBNs 204A, 204B by ES 214B and ES 214C. L2 customer network 212C is coupled to PBN 204B by ES 214D.

L2 switches within the backbone domain provided by PBBN 203, such as core switches (CS 210A and CS 210B), typically learn and maintain L2 state information (e.g., media access control (MAC) addresses and respective physical ports by which the MAC addresses are reachable) for devices within the PBBN. Conversely, edge switches (e.g., ES 214A through ES 214D) may learn and maintain L2 state information including MAC addresses for devices within a customer domain including the devices within PBNs 204 and L2 customer networks 212. Access switches (e.g., AS 208A through AS 208D) may learn and maintain L2 state information including MAC addresses and corresponding ports for devices in both the customer domain and the backbone domain to provide bridging services as BEBs. In this way, network 200 provides a large-scale, carrier-class L2 network based on a hierarchy of L2 bridges. In one example, network 200 is a metropolitan access network that covers a metropolitan area and is based on Ethernet communications. Network 200 may be used to connect individual subscribers, businesses, or even large-scale data centers to a larger service network or the Internet.

In one example, network 200 conforms to the standards set forth in IEEE 802.1 ah. Moreover, although referred to herein as L2 switches, edge switches 214, access switches 208, and core switches 210 may be routers or other devices that incorporate L2 switching functionality. Edge switches 214, access switches 208, and core switches 210 may be network devices similar to network device 30 of FIG. 2. Further details of PBB can be found in Institute of Electrical and Electronics Engineers, Inc., IEEE P802.1ah-2008, "Standard for Local and Metropolitan Area Networks—Virtual Bridged Local Area Networks—Amendment 6: Provider Backbone Bridges," hereby incorporated by reference in its entirety.

In operation, L2 network communications (e.g., Ethernet frames) flow between PBNs 204 via PBBN 203. Customer traffic originating from L2 customer networks 212 typically arrives at edge switches 214 in association with a customer VLAN. That is, L2 communications (e.g., Ethernet frames) from L2 customer networks 212 typically carry customer VLAN tags and customer VLAN identifiers in addition to source and destination media access control (MAC) addresses for devices within the L2 customer networks. Edge switches 214 receive the L2 communications from L2 customer networks 212 and associate the communications with a service VLAN (S-VLAN) defined within the PBN. Each S-VLAN has a corresponding identifier (S-VID), and edge switches 214 tag each L2 frame with an S-VLAN tag associated with the corresponding PBN 204 with which the L2 frame was received.

Traffic flowing from one PBN 204 through PBBN 203 to a different PBN 204 is carried by the service VLAN and is further encapsulated within a backbone VLAN as part of the bridging service provided by the BEBs. That is, L2 frames flowing through PBBN 203 further carry backbone VLAN tags and backbone VLAN identifiers in addition to source and destination MAC addresses for core switches 210 within PBBN 203. As operational BEBs, AS 208A through AS 208D provide a mapping between the VLAN and MAC address space of PBNs 204 and PBBN 203.

For example, L2 traffic may flow from ES 214D to ES 214A over a first SVLAN 220 bridged to flow through backbone VLAN (B-VLAN) 221. L2 traffic of SVLAN 220 flows through PBBN 203 from AS 208D to AS 208A via B-VLAN 221 in which the L2 traffic is further encapsulated and decapsulated via AS 208A and 208AD operating as BEBs. In steady state operation, CS 210A, CS 210B, AS 208A and AS 208D each maintain MAC state information for B-VLAN 221, including state information indicating which physical interface the MAC address for AS 208A is reachable.

ASes 208 and ESes 214 may also be configured by administrators with static MAC addresses. In the PBB architecture, L2 communications do not come via pseudowires, but rather come "on the fly" by virtue of interface configuration. There is no signaling protocol used for setting up the multipoint Ethernet service in the bridging context, as there is with VPLS. Nonetheless, the techniques of this disclosure can be applied in the bridging context for propagating the static MAC addresses, identified as such, between the access switches 208 or edge switches 214 in network 200. As one example, a new MAC registration protocol (MRP) can be created for exchanging the static MAC identification information between network devices, such as between access switches 208 or edge switches 214 in network 200.

For example, access switch 208A may originate and send a static MAC identification MRP message to access switches 208B-208D, where the static MAC identification MRP message includes a list of static MAC addresses, and identifies the listed MAC addresses as being static MAC addresses configured on the sending access switch 208A. The format of the static MAC identification MRP message may be similar in some ways to the VPLS static MAC message format 64 described with respect to FIGS. 3-4. Similarly, the AS 208s or ES 214 that receive the static MAC identification MRP message may process the message in a similar manner as described above in the VPLS context, and store the static MAC addresses as being associated with the originating network device. Various aspects described above for purposes of example with respect to the VPLS context can be done in the bridging example as well.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
by a first network device, sending a capability advertisement to one or more peer network devices, wherein the capability advertisement specifies a static layer two (L2) address identification capability indicating that the first network device has an ability to process routine protocol control messages conforming to a static L2 address identification message type;
by the first network device, receiving a control message at an interface of the first network device, wherein the control message is received from a second network device, wherein the first network device and the second network device use a multipoint service that provides L2 connectivity to transport L2 communications for a plurality of L2 networks through an intermediate network coupling the plurality of L2 networks, wherein the control message specifies one or more L2 addresses of network devices that are positioned within the L2 networks and reachable through the second network device, wherein the control message identifies the L2 addresses as static L2 addresses that are to be persistently maintained at the first network device as reachable by the interface; and
in response to receiving the control message and by the first network device, identifying the control message as conforming to the static L2 address identification message type and storing the L2 addresses as persistently maintained static L2 addresses being reachable by the interface of the first network device at which the control message was received.

2. The method of claim 1, further comprising:
when no network traffic destined for one of the static L2 addresses has been received within a configured time period, continuing to store the static L2 address by the first network device without removing the static L2 address from the set of stored L2 addresses.

3. The method of claim 1, further comprising:
when network traffic having a source address comprising one of the static L2 addresses is received on an interface other than the interface at which the control message was received, dropping the network traffic without modifying a stored reachability address of the persistently maintained static L2 addresses being reachable by the interface of the first network device at which the control message was received.

4. The method of claim 1, further comprising:
by the first network device, dynamically learning a second interface of the network device through which a destination L2 address is reachable, wherein the destination L2 address comprises a dynamically learned L2 address;
by the first network device, storing an association between the second interface and the destination L2 address.

5. The method of claim 4, further comprising:
when no network traffic destined for the dynamically learned L2 address has been received within the configured time period, removing, by the network device, the dynamically learned L2 address from a set of stored L2 addresses; and
when no network traffic destined for one of the static L2 addresses has been received within a configured time period, continuing to store the static L2 address by the first network device without removing the static L2 address from the set of stored L2 addresses.

6. The method of claim 4, further comprising:
when network traffic having a source address comprising the dynamically learned L2 address is received on an interface other than the second interface dynamically learned by the first network device, modifying a stored reachability address of the dynamically learned L2 address to reflect the interface of the first network device other than the second interface; and
when network traffic having a source address comprising one of the static L2 addresses is received on an interface of the first network device other than the interface at which the control message was received, dropping the network traffic without modifying a stored reachability address of the persistently maintained static L2 addresses being reachable by the interface at which the control message was received.

7. The method of claim 4, wherein the dynamically learned L2 address is reachable by a pseudowire between the first network device and the second network device, and wherein the static L2 addresses identified by the control message are reachable by the pseudowire between the first network device and the second network device.

8. The method of claim 1, further comprising:
prior to storing the L2 addresses specified by the received control message, comparing, by the first network device, the L2 addresses with stored static L2 addresses to determine whether any the L2 addresses should be stored as static L2 addresses.

9. The method of claim 1, wherein the interface comprises a physical port of the first network device.

10. The method of claim 1, wherein the multipoint service comprises a Border Gateway Protocol (BGP)-based virtual private local area network service (VPLS), and wherein the control message comprises a BGP signaling message.

11. The method of claim 10, wherein the BGP signaling message carries the set of L2 addresses in type-length-value fields of the BGP signaling message, wherein the BGP signaling message includes message type information identifying the BGP signaling message as a VPLS static Media Access Control (MAC) identification message, and
wherein identifying the control message as conforming to the static L2 address identification message type comprises identifying the BGP signaling message as conforming to the VPLS static MAC identification message type.

12. The method of claim 11, wherein sending the capability advertisement comprises sending a BGP Capability advertisement to one or more BGP peer network devices, wherein the BGP Capability advertisement specifies a VPLS static MAC identification Capability indicating an ability to process routing protocol control messages conforming to the VPLS static MAC identification message type.

13. The method of claim 1, wherein the multipoint service comprises a Label Distribution Protocol (LDP)-based virtual private local area network service (VPLS), and wherein the control message comprises an LDP signaling message.

14. The method of claim 13, wherein the LDP signaling message carries the set of L2 addresses in type-length-value fields of the LDP signaling message, wherein the LDP signaling message includes message type information identifying the LDP signaling message as a static L2 address identification message.

15. The method of claim 1, wherein the static L2 addresses comprise static Media Access Control (MAC) addresses associated with customer devices for which the first network device provides the multipoint services.

16. The method of claim 1, wherein the first network device and the second network device comprise provider edge (PE) routers.

17. The method of claim 1, further comprising:
executing an extended L3 routing protocol within a control plane of the first network device;
maintaining, by a data plane VPLS module within a data plane of the first network device, a table associated with the VPLS domain that records associations between pseudowires and L2 addresses of customer devices within customer networks attached to an autonomous system by the first network device of the autonomous system;
learning, by a control plane VPLS module within the control plane of the first network device, the L2 addresses of the customer devices; and
providing, by the control plane VPLS module, the associations to the data plane VPLS module.

18. A method comprising:
by a first network device, receiving a capability advertisement from a second network device, wherein the Capability advertisement specifies a static layer two (L2) address identification capability indicating that the second network device has an ability to process routing protocol control messages conforming to a static L2 address identification message type;
detecting a configuration update to one or more static L2 addresses configured on the first network device; and
in response to the detecting, originating and outputting to the second network device a control message that specifies the one or more static L2 addresses of network devices that are positioned within the L2 networks and reachable through the first network device, wherein the control message conforms to the static L2 address identification message type and identifies the static L2 addresses as static L2 addresses that are to be persistently maintained at the second network device as reachable by an interface on which the second network device receives the control message, wherein the first network device and the second network device use a multipoint service that provides L2 connectivity to transport L2 communications for a plurality of L2 networks through an intermediate network coupling the plurality of L2 networks.

19. The method of claim 18, further comprising:
executing a layer three (L3) routing protocol within a control plane of the first network device;
executing a data plane VPLS module within a data plane of the first network device, wherein the data plane VPLS module maintains a table associated with the VPLS domain that records associations between pseudowires and L2 addresses of customer devices within customer networks attached to the autonomous system by the first network device of the autonomous system; and
executing a control plane VPLS module within the control plane of the first network device, wherein the control plane VPLS module learns the L2 addresses of the customer devices and provides the associations to the data plane VPLS module.

20. The method of claim 19,
wherein originating the control message comprises:
by the L3 routing protocol, requesting from the control plane VPLS module a set of L2 addresses associated with the VPLS customer site;
with the control plane VPLS module, obtaining the set of L2 addresses associated with the VPLS customer site from the data plane VPLS module;
the control plane VPLS module sending the set of set of L2 addresses associated with the VPLS customer site to the L3 routing protocol; and
with the L3 routing protocol, generating the control message that includes the static L2 addresses associated with the VPLS customer site.

21. A network device comprising:
one or more interfaces for sending a capability advertisement to one or more peer network devices, wherein the capability advertisement specifies a static layer two (L2) address identification capability indicating that the network device has an ability to process routing protocol control messages conforming to a static L2 address identification message type,
wherein the one or more interfaces receive a control message, wherein the control message is received from a second network device, wherein the network device and the second network device use a multipoint Ethernet service that provides layer two L2 connectivity between L2 networks, wherein the control message specifies one or more L2 addresses of customer network devices that are provided connectivity to an autonomous system by the second network device, wherein the control message identifies the L2 addresses as static L2 addresses that are to be persistently maintained at the network device as reachable by the interface; and a hardware-based processor for executing a static L2 address module that, in response to receiving the control message, identifies the control message as conforming to the static L2 address identification message type and stores the L2 addresses as persistently maintained static L2 addresses being reachable by the interface at which the control message was received.

22. The network device of claim 21, wherein when no network traffic destined for one of the static L2 addresses has been received within a configured time period, the static L2 address module continues to store the static L2 address by the first network device without removing the static L2 address from the set of stored L2 addresses.

23. The network device of claim 21, wherein when network traffic having a source address comprising one of the static L2 addresses is received on an interface other than the interface at which the control message was received, the static L2 address module drops the network traffic without modifying a stored reachability address of the persistently maintained static L2 addresses being reachable by the interface at which the control message was received.

24. The network device of claim 21, wherein the static L2 addresses comprise static Media Access Control (MAC) addresses associated with customer devices for which the first network device provides the multipoint services, and wherein the multipoint services comprise virtual private local area network service (VPLS), wherein the network device comprises a provider edge (PE) router.

25. The network device of claim 21, wherein the static L2 addresses comprise static Media Access Control (MAC) addresses associated with customer devices for which the first network device provides the multipoint services, and wherein the multipoint Ethernet services comprise virtual private local area network service (VPLS), wherein the network device comprises an access switch of a provider bridge network (PBN), wherein the autonomous system comprises a Provider Backbone Bridged Network (PBBN).

26. The network device of claim 21, wherein the static L2 addresses comprise static Media Access Control (MAC) addresses associated with customer devices for which the first network device provides the multipoint services, and wherein the multipoint services comprise virtual private local area network service (VPLS), wherein the network device comprises an edge switch of a provider bridge network (PBN), wherein the autonomous system comprises a Provider Backbone Bridged Network (PBBN).

27. A non-transitory computer-readable storage medium comprising instructions for causing a programmable processor of a first network device to:

send a capability advertisement to one or more peer network devices, wherein the capability advertisement specifies a static layer two (L2) address identification capability indicating that the first network device has an ability to process routing protocol control messages conforming to a static L2 address identification message type;

receive the control message at an interface of a first network device, wherein the control message is received from a second network device, wherein the first network device and the second network device use a multipoint service that provides L2 connectivity to transport L2 communications for a plurality of L2 networks through an intermediate network coupling the plurality of L2 networks, wherein the control message specifies one or more L2 addresses of customer network devices that are positioned within the L2 networks and reachable through the second network device, wherein the control message identifies the L2 addresses as static L2 addresses that are to be persistently maintained at the first network device as reachable by the interface; and in response to receiving the control message and by the first network device, identify the control message as conforming to the static L2 address identification message type and store the L2 addresses as persistently maintained static L2 addresses being reachable by the interface of the first network device at which the control message was received.

* * * * *